United States Patent
Thompson

[15] 3,692,743
[45] Sept. 19, 1972

[54] PREPARATION OF 2,5-DIMETHYLHEXADIENES

[72] Inventor: Robert M. Thompson, Wilmington, Del.

[73] Assignee: Sun Oil Company, Philadephia, Pa.

[22] Filed: April 16, 1971

[21] Appl. No.: 134,857

[52] U.S. Cl. .............................................260/681 R
[51] Int. Cl..............................................C07c 11/12
[58] Field of Search......................................260/681

[56] References Cited

UNITED STATES PATENTS 2,737,535   3/1956   Taylor et al. ...............260/668
2,910,520   10/1959  Guest et al..................260/681

FOREIGN PATENTS OR APPLICATIONS 506,038   5/1939   Great Britain.............260/681

OTHER PUBLICATIONS

" Catalytic Transformations of Heterocyclic Compounds" Yuryer et al. Journal of General Chemistry U.S.S.R. 1956 pp. 293– 296, Vol. 26.

Primary Examiner—Delbert E. Gantz
Assistant Examiner—J. Nelson
Attorney—George L. Church, Donald R. Johnson, Wilmer E. McCorquodale, Jr. and Stanford M. Back

[57] ABSTRACT

Selective formation of 2,5-dimethylhexadiene-2,4, or mixtures of the same with the corresponding 2,5-dimethylhexadiene-1,4, or of the latter with 2,5-dimethylhexadiene-1,5 in good yield is achieved by the vapor phase ring opening dehydration of 2,2,5,5-tetramethyltetrahydrofuran, using alkali or platinum selected metal oxide catalysts at varying temperatures and liquid hourly space velocities.

8 Claims, No Drawings

PREPARATION OF 2,5-DIMETHYLHEXADIENES

BACKGROUND OF THE INVENTION

This invention relates to the formation of 2,5-dimethylhexadiene isomers. More particularly, this invention relates to the ring opening dehydration of 2,2,5,5-tetramethyltetrahydrofuran ("TMTHF") with certain metal oxide catalysts to form selectively either 2,5-dimethylhexadiene-2,4 ("-2,4"); or mixtures of -2,4 with 2,5-dimethylhexadiene-1,4 ("-1,4"); or mixtures of -1,4 with 2,5-dimethylhexadiene-1,5 ("-1,5"), all of which are useful as cross-linking agents and as monomers for copolymers in the area of plastics and elastomers.

J. Gen. Chem., U.S.S.R., 26, 293–6 (1956) teaches that treatment of 2,2,5,5-tetramethyltetrahydrofuran with alumina in the presence of steam yields 50 percent of -2,4, and 18 percent of -1,5, while catalytic dehydration of the corresponding diol yields 60 percent of -2,4, and 9 percent of -1,5. Thus, selective formation of the -2,4, or formation of the corresponding -1,4 isomer is neither taught nor suggested by this prior art reference.

SUMMARY OF THE INVENTION

It has now been found, in accordance with the present invention, that by the judicious selection of certain metal oxide ring opening dehydration catalysts, it is possible to convert 2,2,5,5-tetramethyltetrahydrofuran to selected 2,5-dimethylhexadiene isomers wherein at most two of the three possible isomers are formed to the substantial exclusion of the third, and often just one of said isomers is formed, thereby facilitating separation and recovery of said isomers.

Thus, in one embodiment of this invention, it has been found that when TMTHF is contacted with a platinum-on-alumina reforming-type catalyst, or with a base-washed alumino-silicate zeolite catalyst, within certain specified temperature ranges, there is obtained the -2,4 isomer to the substantial exclusion of any of the other isomers. In addition to good selectivity for the -2,4 isomer, yields of from 40 to 80 percent by weight are readily obtainable.

In this and each further embodiment of the invention, the catalytic ring opening dehydration is conveniently achieved by admixing the TMTHF with a carrier gas such as hydrogen or nitrogen, passing the mixture in a vapor phase over a bed of selected catalyst at varying liquid hourly space velocities (LHSV) and temperatures, and recovering and separating the various isomers. The TMTHF is desirably admixed with the carrier gas in mole ratios of 4 to 1, with an LHSV of about 0.5 to 1.5, and preferably about 1.

In the case of the platinum-on-alumina catalyst, it is preferred that the reaction be carried out at a temperature of from about 360° to 470° C, and preferably 440° to 460° C, at an LHSV of about 0.7 to 1.3, and preferably 1.0. When these reaction conditions are employed, the product is comprised substantially of the -2,4 diene. However, surprisingly, it has further been found that when both the temperature and flow rate are substantially reduced, i.e., when the temperature is in the range of about 350° to 370° C, and the LHSV is about 0.8 to 1.2, there is produced instead a major proportion of the -1,4 diene with only a minor proportion of the -2,4 diene. Thus, by using the same catalyst but varying the reaction conditions the nature of the final product may be carefully controlled. The catalyst used in this embodiment of the process is any commercially available alumina catalyst having impregnated therein from about 0.1 to 1.0 percent by weight of platinum, and preferably about 0.5 percent of platinum, as for example RD–150 (Englehard Industries, N.J., USA).

The 2,4-diene, as aforestated, may likewise be formed to the substantial exclusion of the other isomers when a base-washed alumino-silicate zeolite catalyst is employed at temperatures of about 200° to 270°, and preferably 245° to 265° C, at an LHSV of about 0.5 to 1.3, and preferably 1.0. The catalyst is desirably any commercial alumino-silicate zeolite which is 10 to 100 percent crystalline by X-ray, and contains an exchanged alkali metal using 10 to 100 percent of exchange capacity (for example sodium-washed Linde type Y zeolite).

In a further embodiment of this invention, it has been found that mixtures of two of the three isomers may selectively be formed when different metal oxide catalysts are substituted for those described above. For example, when an activated alumina is employed, at temperatures of about 250° to 400° C, and preferably 250° to 300° C, and an LHSV of about 0.8 to 1.2, and preferably 1.0, mixtures of the -2,4 diene and -1,4 diene are obtained, wherein the -2,4 diene is the predominant species. These two isomers are readily separated by distillation. The catalyst may be any commercially available activated alumina, such as F–10 (Alcoa Corp., U.S.A.).

In still a further embodiment of this invention, it has been found that when there is employed a base-washed sintered metal oxide such as an aluminum silicate-aluminum oxide mixture, e.g., "Corhart" (Corhart Refractories Co., U.S.A.), at temperatures in the range of from 475° to 525° C, and preferably 480° to 510° C, at an LHSV of from 0.8 to 1.5, and preferably 1.0, there is obtained a mixture of the -1,4 and -1,5 dienes. Corhart, particularly when it has been neutralized, is generally an inert material, at least for purposes of this invention, when contacted with reactants at temperatures below about 400° to 450° C.

The various embodiments of this process will now be illustrated by the following examples.

EXAMPLES 1–9

A series of runs was carried out using a flow reactor fed by a constant-speed syringe pump containing a mixture of carrier gas and TMTHF in amounts of 4 moles of gas to 1 mole of TMTHF. The flow reactor was provided with an inert material (base-washed Corhart) in a heating zone which served to vaporize the TMTHF, followed by a catalyst bed. The pump was adjusted to provide varying flow rates at different temperatures, depending upon the catalyst employed. Except where indicated, the LHSV was 1, i.e., 20 cc/hr. of TMTHF/20 cc of catalyst.

The resulting vapors were then trapped within ice water traps and analyzed by vapor phase chromatography to give the results shown in Table I below.

TABLE I

| Ex. | Catalyst | Temp °C | Carrier Gas | Corner Gas Flow | LHSC | Products[b] 2,4 | 1,5 | 1,4 |
|---|---|---|---|---|---|---|---|---|

| | | | Rate(a) | | | | |
|---|---|---|---|---|---|---|---|
| 1 RD-150(c) | 360 | H₂ | 30 | 1 | 20 | 5 | 60 |
| 2 RD-150(c) | 455 | H₂ | 120 | 1 | 80 | — | — |
| 3 F-10 Alumina(d) | 350 | N₂ | 60 | 1 | 60 | 2 | 18 |
| 4 F-10 Alumina(d) | 300 | N₂ | 60 | 1 | 82 | — | 12 |
| 5 F-10 Alumina(d) | 250 | n₂ | 60 | 1 | 88 | — | 12 |
| 6 Base-Washed Corhart(e) | 500 | N₂ | 60 | 3/2 | — | 25 | 24 |
| 7 Base-Washed Corhart(e) | 400 | N₂ | 60 | 1 | — | — | — |
| 8 NaY Zeolite(f) | 200 | N₂ | 60 | 1 | 40 | — | — |
| 9 NaY Zeolite(f) | 250 | N₂ | 60 | 1 | 65 | — | — |
| 10 NaY Zeolite(f) | 270 | N₂ | 60 | 1 | 42 | — | — |

(a)cc/mn
(b)weight percent
(c)alumina with 0.5 weight percent platinum
(d)activated alumina
(e)sodium-washed Corhart
(f)sodium-exchanged Linde type Y zeolite

What is claimed is:

1. A process for the preparation of 2,5-dimethylhexadiene-2,4 which comprises contacting tetramethyltetrahydrofuran in a vapor phase with a catalyst selected from the group consisting of platinum-on-alumina and an alkali metal exchanged crystalline alumino-silicate zeolite at an elevated temperature, wherein said temperature is at least 360° C when the platinum-on-alumina catalyst is employed.

2. The process according to claim 1 wherein the tetramethyltetrahydrofuran in contacted with the platinum-on-alumina catalyst at a temperature in the range of from about 360° to 470° C at a liquid hourly space velocity of about 0.7 to 1.3.

3. The process according to claim 1 wherein the tetramethyltetrahydrofuran is contacted with the alkali metal exchanged alumino-silicate zeolite at a temperature in the range of from about 200° to 350° C at a liquid hourly space velocity of about 0.5 to 1.3.

4. A process for the preparation of a mixture of 2,5-dimethylhexadiene-2,4 and 2,5-dimethylhexadiene-1,4 which comprises contacting tetrahydrofuran in a vapor phase with a catalyst selected from the group consisting of platinum-on-alumina and activated alumina at an elevated temperature, wherein said temperature is no greater than 360° C when the platinum-on-alumina catalyst is employed.

5. The process according to claim 4 wherein the tetramethyltetrahydrofuran is contacted with the platinum-on-alumina catalyst at a temperature in the range of from about 350° to 370° C at a liquid hourly space velocity of about 0.7 to 1.3.

6. The process according to claim 4 wherein the tetramethyltetrahydrofuran is contacted with the activated alumina catalyst at a temperature of from about 200° to 270° C, at a liquid hourly space velocity of about 0.5 to 1.3.

7. A process for the preparation of a mixture of 2,5-dimethylhexadiene-1,5 and 2,5-dimethylhexadiene-1,4, which comprises contacting tetramethyltetrahydrofuran in a vapor phase with a catalyst comprising an alkali metal exchanged aluminum silicate - aluminum oxide mixture oxide at an elevated temperature.

8. The process according to claim 7 wherein the reaction is carried out at a temperature in the range of from about 475° to 525° C, at a liquid hourly space velocity of about 0.8 to 1.2.

* * * * *